(12) United States Patent
Hartwell et al.

(10) Patent No.: US 7,118,679 B2
(45) Date of Patent: Oct. 10, 2006

(54) METHOD OF FABRICATING A SHARP PROTRUSION

(75) Inventors: Peter G. Hartwell, Sunnyvale, CA (US); Uija Yoon, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 43 days.

(21) Appl. No.: 10/902,762

(22) Filed: Jul. 30, 2004

(65) Prior Publication Data

US 2006/0021962 A1    Feb. 2, 2006

(51) Int. Cl.
*B44C 1/22*     (2006.01)
*H01L 21/00*    (2006.01)

(52) U.S. Cl. .............................. 216/11; 216/41; 216/74; 216/79; 438/733; 438/734; 438/739; 450/5

(58) Field of Classification Search ................ 216/11, 216/41, 74, 79; 438/733, 734, 739; 430/5
See application file for complete search history.

(56) References Cited

U.S. PATENT DOCUMENTS 4,968,585 A * 11/1990 Albrecht et al. ............ 430/320
5,391,259 A *  2/1995 Cathey et al. ................ 438/20
6,069,018 A *  5/2000 Song et al. ................... 438/20

* cited by examiner

*Primary Examiner*—Shamim Ahmed

(57) ABSTRACT

A method of fabricating a sharp protrusion on an underlayer is disclosed. A tip layer is deposited on an underlayer and then a mask layer is deposited on the tip layer. The mask layer is patterned with a beam-and-hat pattern that is used to form a beam-and-hat mask in the mask layer. Portions of the tip layer that are not covered by the beam-and-hat mask are isotropically etched to form a tip including a vertex. Beam portions of the beam-and-hat mask support the hat portion and prevent a release of the hat portion during the isotropic etching process. An anisotropic etch process can be used prior to the isotropic etching process to change a character of the tip. The underlayer can be patterned and etched to form a cantilever that includes the sharp protrusion extending outward of a surface of the cantilever.

20 Claims, 10 Drawing Sheets

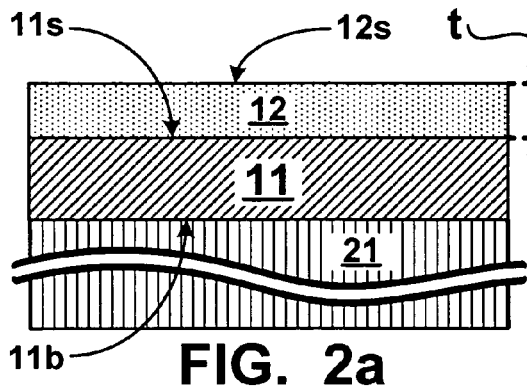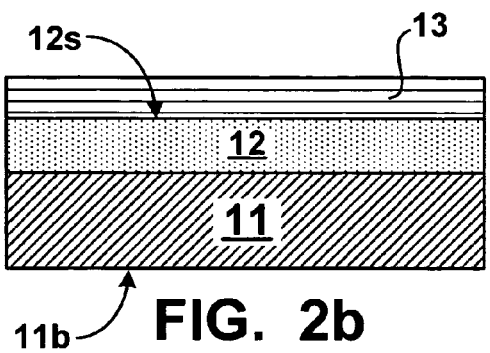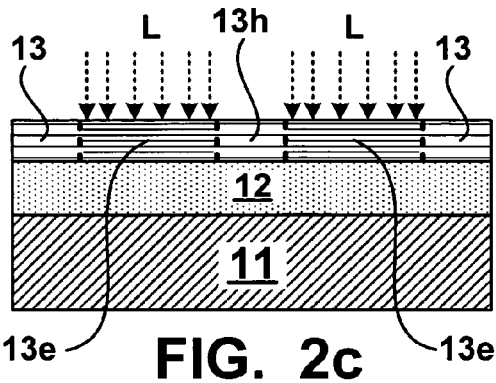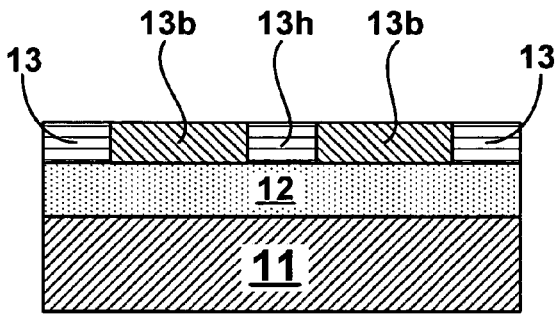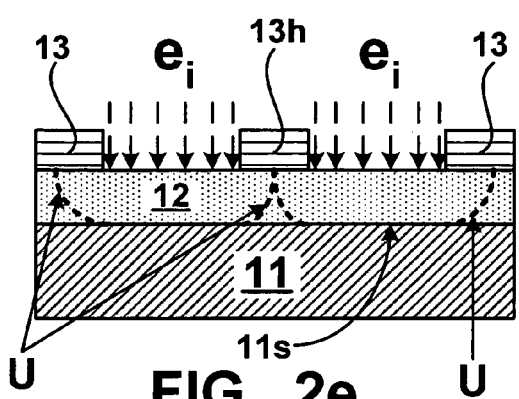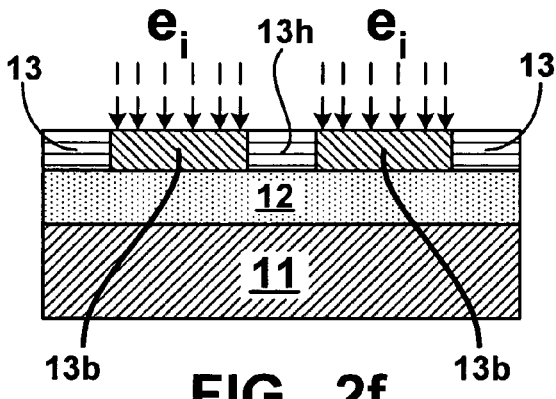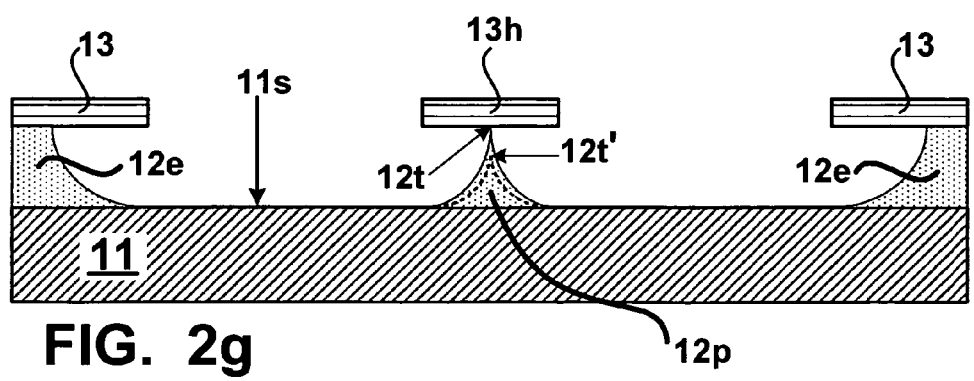

FIG. 2*l*

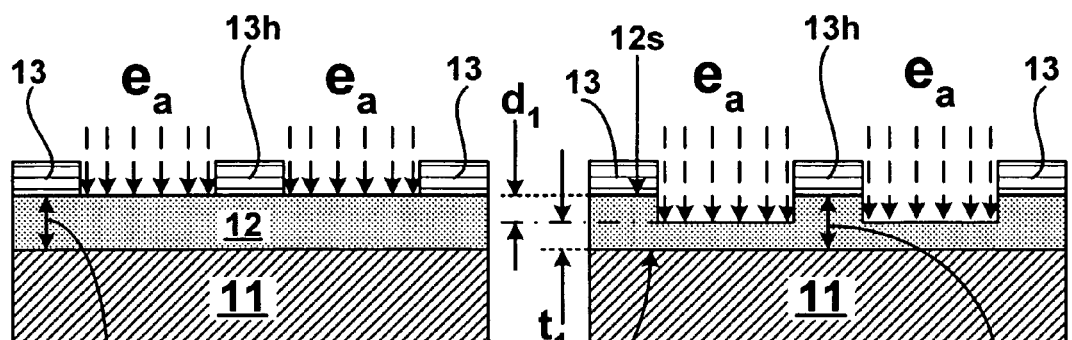
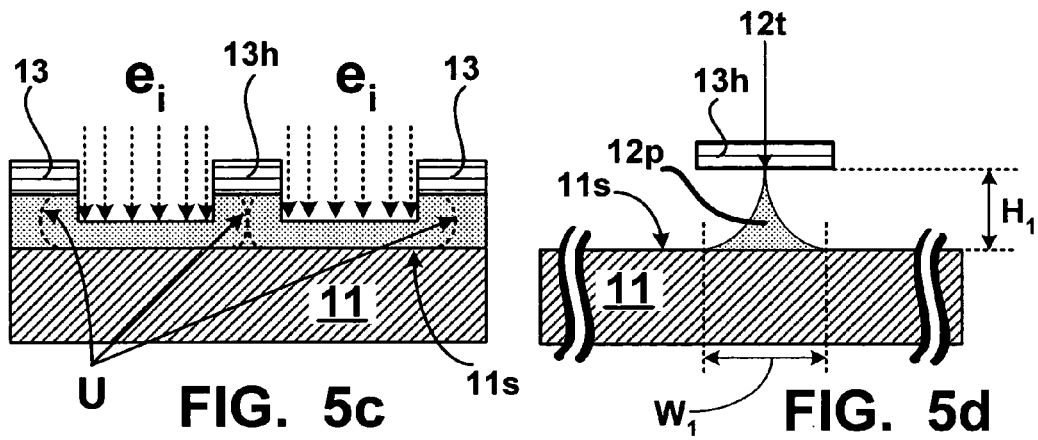
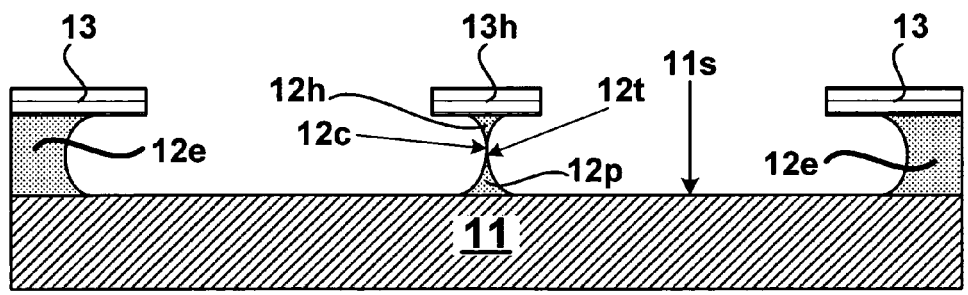
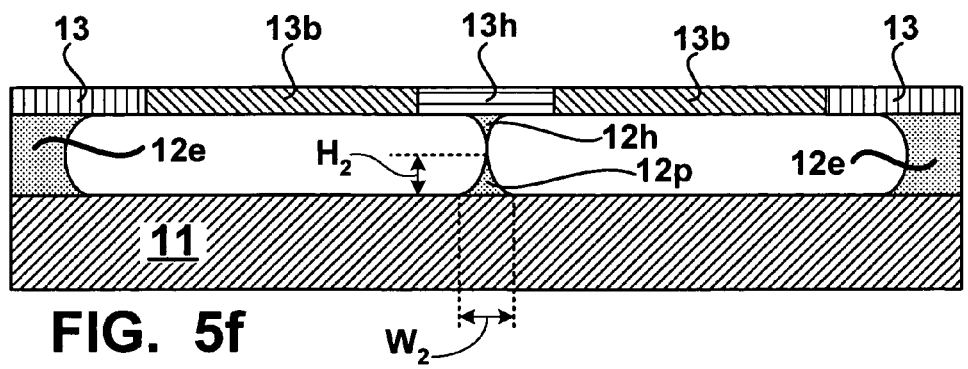
FIG. 5a  FIG. 5b  FIG. 5c  FIG. 5d  FIG. 5e  FIG. 5f

METHOD OF FABRICATING A SHARP PROTRUSION

FIELD OF THE INVENTION

The present invention relates generally to a method of fabricating a sharp protrusion on an underlayer. More specifically, the present invention relates to a method of fabricating a sharp protrusion on an underlayer using a beam-and-hat pattern to form a beam-and-hat mask on a tip layer.

BACKGROUND OF THE ART

Sharp micro-scale tips are used in many electronic devices. For example, in imaging devices such as scanning tunneling microscopes and atomic force microscopes, in data storage devices that sense a data bit by a contact between the tip and a data storage media or by an electron beam emitted by the tip to sense the data bit stored in the media, and in display devices where the tip (e.g. a Spindt emitter tip) is used to emit an electron beam that excites photons from a phosphor layer.

For data storage devices, the tip is usually placed on a cantilever beam to allow the tip to be moved relative to the device or relative to the media that stores the data. Subtractive and additive tip processes can be used to form the tip. Prior subtractive tip processes include forming the tip on a cantilever as part of a silicon on insulator (SOI) wafer process. The tips are formed from a layer of single crystal silicon (Si) already on the wafer as part of the SOI process. Silicon etching and high temperature oxidation processes are used to form the tips. However, a disadvantage to the prior subtractive processes is that the high temperatures required to form the tip greatly limits an ability to integrate the tips and cantilevers with microelectronic devices on the same chip because the high temperatures can damage the microelectronic devices or a data storage media carried by the chip.

For display devices, such as field emission displays (FED) based on a Spindt type emitter, prior additive processes can be used to directly deposit a material for the tip through a circular mask. However, the prior Spindt tip processes require complex masking steps to form small holes and special deposition equipment such as an evaporator with an extremely long throw. Notwithstanding the use of correct processing techniques and equipment, getting good uniformity among many tips across the same wafer is very difficult.

Other prior additive tip processes exist to make tips. Typically, in those prior processes a small square or circle is patterned in a layer of a photoresist material and the pattern is used as a mask for a subsequent isotropic etch process. The mask is also referred to as a "hat" and the hat sits on top of a vertex of the tip as the tip is formed by the isotropic etch process. The tip gradually sharpens over time as the isotropic etch process proceeds. However, difficulty arises as the etch time for the isotropic etch process increases and the tip is sharpened to a sharp point where a surface area connecting the hat to the tip is very small and the hat is released from the tip. Hat release can damage the tip (i.e. breaking the sharp point) and/or cause a defect when the hat lands on some portion of the device. Consequently, one disadvantage of the prior additive tip processes is that the hat is supported by the vertex and can cause a defect and/or can damage the tip upon release. Moreover, the exposed tip may be damaged unless the isotropic etch process is stopped exactly as the hat is released. Therefore, another disadvantage of prior additive tip processes is that the tip is prone to damage unless an endpoint of the etching process is exactly timed for all of the tips being formed.

Consequently, there exists a need for a method of fabricating a sharp protrusion that can be accomplished at low processing temperatures using standard microelectronics processing equipment. There is also a need for a method of fabricating a sharp protrusion that eliminates damage and/or defects caused by hat release. Moreover, there is a need for a method of fabricating a sharp protrusion that eliminates the need to exactly time an etching endpoint and produces sharp protrusions having a uniform shape across a substrate they are fabricated on.

SUMMARY OF THE INVENTION

The method of the present invention solves the aforementioned needs. The method includes depositing a tip layer on an underlayer and then depositing a mask layer on the tip layer. The mask layer is patterned with a beam-and-hat pattern to form a beam-and-hat mask in the mask layer. The tip layer is isotropically etched to undercut portions of the tip layer that are covered by the beam-and-hat mask. The mask layer is then removed. The isotropic etching forms sharp protrusion including a tip and a vertex. Optionally, after the removing of the mask layer, a protective layer can be deposited over the tip layer, followed by a patterning of the protective layer to form an etch mask that completely covers the tip. Optionally, a remainder of the tip layer that is not covered by the etch mask can be removed by etching, followed by the removing of the etch mask.

In an alternative method, after the patterning of the mask layer as described above, the tip layer is anisotropically etched to a predetermined depth, followed by the aforementioned isotropic etching of the tip layer to undercut portions of the tip layer that-are covered by the beam-and-hat mask. The isotropic etching forms a tip including a vertex.

A beam portion of the beam-and-hat mask holds the hat portion in place during the isotropic etching process so that the hat portion is not released during the etching; thereby, preventing tip damage and/or defects caused by hat release. The processing steps used in forming the sharp protrusion can be accomplished at low temperatures using standard microelectronics processing equipment. The method produces one or more sharp protrusions that are uniform across the underlayer and the method eliminates the need to exactly time an etching endpoint for the tip.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 4b is a top plan view depicting a beam-and-hat mask formed on a mask layer by a patterning process using the beam-and-hat pattern of FIG. 4a.

FIGS. 5a through 5l are cross-sectional views depicting an alternative method of fabricating a sharp protrusion on an underlayer.

DETAILED DESCRIPTION

Figure 1A:
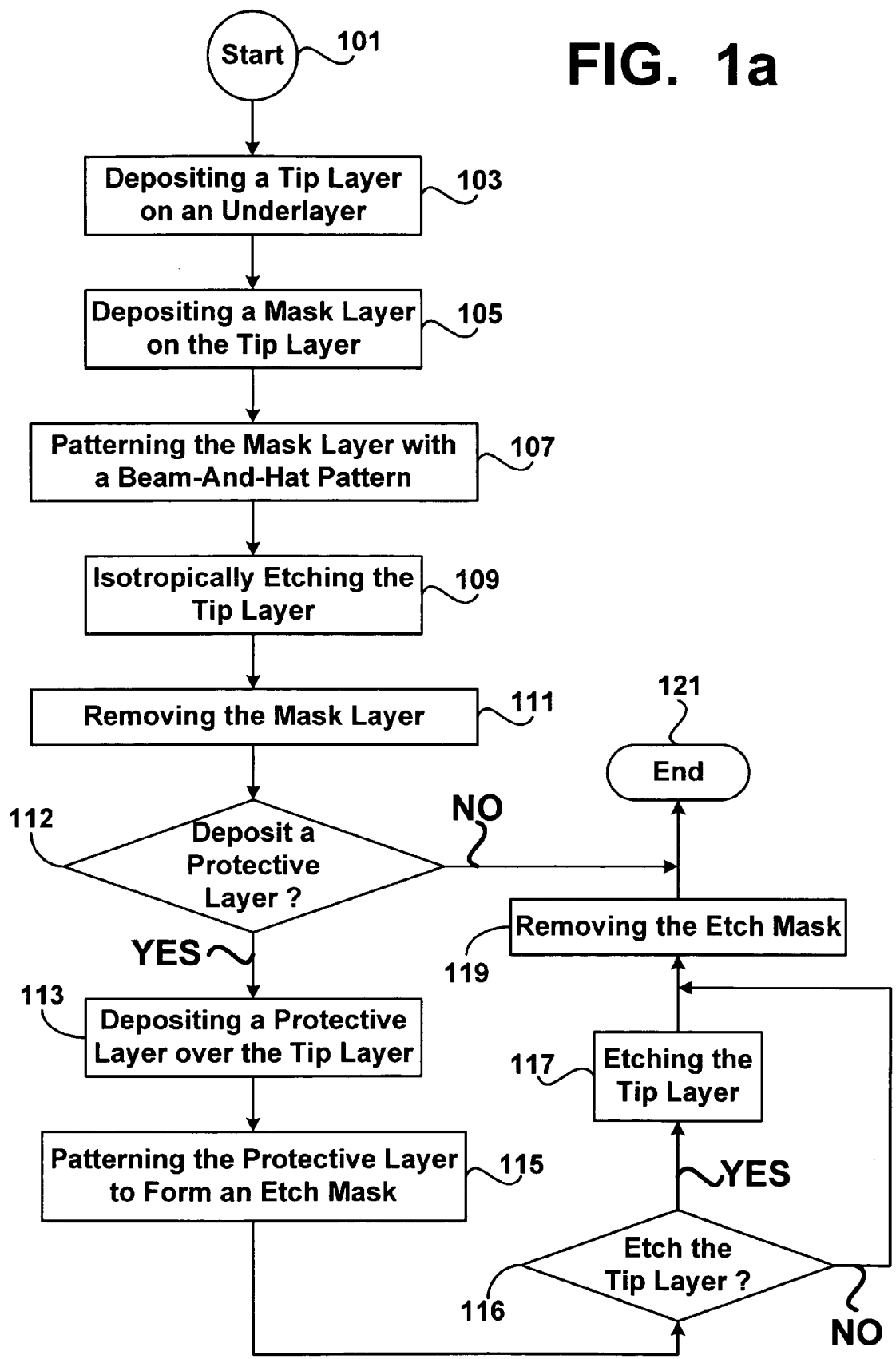
FIG. 1a is a flow diagram depicting a method of fabricating a sharp protrusion on an underlayer.

In the following detailed description and in the several figures of the drawings, like elements are identified with like reference numerals.

As shown in the drawings for purpose of illustration, the present invention is embodied in a method of fabricating a sharp protrusion on an underlayer. The method includes depositing a tip layer on the underlayer. After the depositing of the tip layer, a mask layer is deposited on the tip layer. Subsequently, the mask layer is patterned with a beam-and-hat pattern to form a beam-and-hat mask in the mask layer. The tip layer is isotropically etched to undercut portions of the tip layer that are covered by the beam-and-hat mask. The isotropic etching forms a tip including a vertex. The mask layer is then removed. Optionally, a protective layer can be deposited over the tip layer. The protective layer is patterned to form an etch mask that completely covers the tip. The etch mask is then removed. Optionally, a remainder of the tip layer that is not covered by the etch mask can be removed by etching and then the etch mask can be removed.

Alternatively, a method of fabricating a sharp protrusion on an underlayer includes depositing a tip layer on the underlayer. After the depositing of the tip layer, a mask layer is deposited on the tip layer. The mask layer is patterned with a beam-and-hat pattern to form a beam-and-hat mask in the mask layer. The tip layer is anisotropically etched to a predetermined depth. Following the anisotropic etch, the tip layer is isotropically etched to undercut portions of the tip layer that are covered by the beam-and-hat mask. The isotropic etching forms a tip including a vertex. The mask layer is then removed. Optionally, a protective layer can be deposited over the tip layer. The protective layer is patterned to form an etch mask that completely covers the tip. The etch mask is then removed. Optionally, a remainder of the tip layer that is not covered by the etch mask can be removed by etching and then the etch mask can be removed.

In FIG. 2a and referring to a flow diagram in FIG. 1a, a method 101 of fabricating a sharp protrusion on an underlayer includes at a stage 103, depositing a tip layer 12 on a surface 11s of an underlayer 11. Preferably, the surface 11s is a substantially planar surface so that as deposited, the tip layer 12 will have a uniform thickness t across the surface 11s. Suitable materials for the underlayer 11 include but are not limited to a silicon oxide ($SiO_2$), silicon nitride ($Si_3N_4$), silicon (Si), an electrically conductive material, a dielectric material, and a semiconductor material. The tip layer 12 can be made from a material including but not limited to a dielectric material, an electrically conductive material, and a semiconductor material. As one example, the tip layer 12 can be made from a metal or a metal alloy such as aluminum (Al), chromium (Cr), molybdenum (Mo), or alloys of those metals. Preferably, the material for the tip layer 12 is selected to be compatible with an isotropic etch material that is selective to the material of the tip layer 12.

Deposition processes that are well understood in the microelectronics art can be used to deposit the tip layer 12 and those processes include but are not limited to chemical vapor deposition (CVD), plasma enhanced chemical vapor deposition (PECVD), atomic layer deposition (ALD), e-beam evaporation, thermal evaporation, sputtering, and physical vapor deposition (PVD), for example. Preferably, the deposition process selected produces a homogenous tip layer 12 (i.e. a layer that is devoid of pin holes and other defects) with the uniform thickness t across the surface 11s of the underlayer 11.

Optionally, a bottom surface 11b of the underlayer 11 may be in contact with a substrate layer 21. For example, the substrate layer 21 can be a silicon (Si) wafer. One of ordinary skill in the art will appreciate that one or more layers of material can be positioned below the underlayer 11 and the substrate layer 21 is just one example of such a layer. The underlayer 11 is formed or otherwise deposited at a stage prior to the depositing of the tip layer 12 at the stage 103 (i.e. prior to a start of the method at a stage 101). The underlayer 11 and/or the optional substrate layer 21 can include other structures and/or electrical circuits that were previously fabricated in those layers. If the underlayer 11 or the optional substrate layer 21 include electronic circuits and/or other structures that can be damaged by high processing temperatures, then the deposition process and/or other processes used in the method 101 should be should be processes that operate at a temperature below that which will result in damage to the circuits and/or structures.

In FIG. 2b, at a stage 105, a mask layer 13 is deposited on a surface 12s of the tip layer 12. The mask layer 13 can be made from any suitable masking material including but not limited to a photoresist material such as the type commonly used in the fabrication of microelectronic devices. For example, a photoresist material can be spin deposited to a uniform thickness on the surface 12s of the tip layer 12.

Figure 4A:
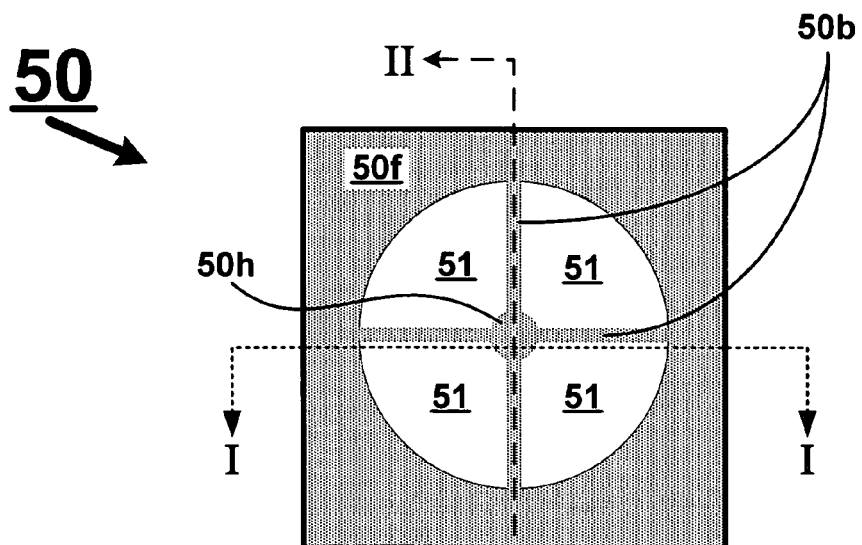
FIG. 4a is a top plan view depicting a beam-and-hat pattern.
Figure 4B:
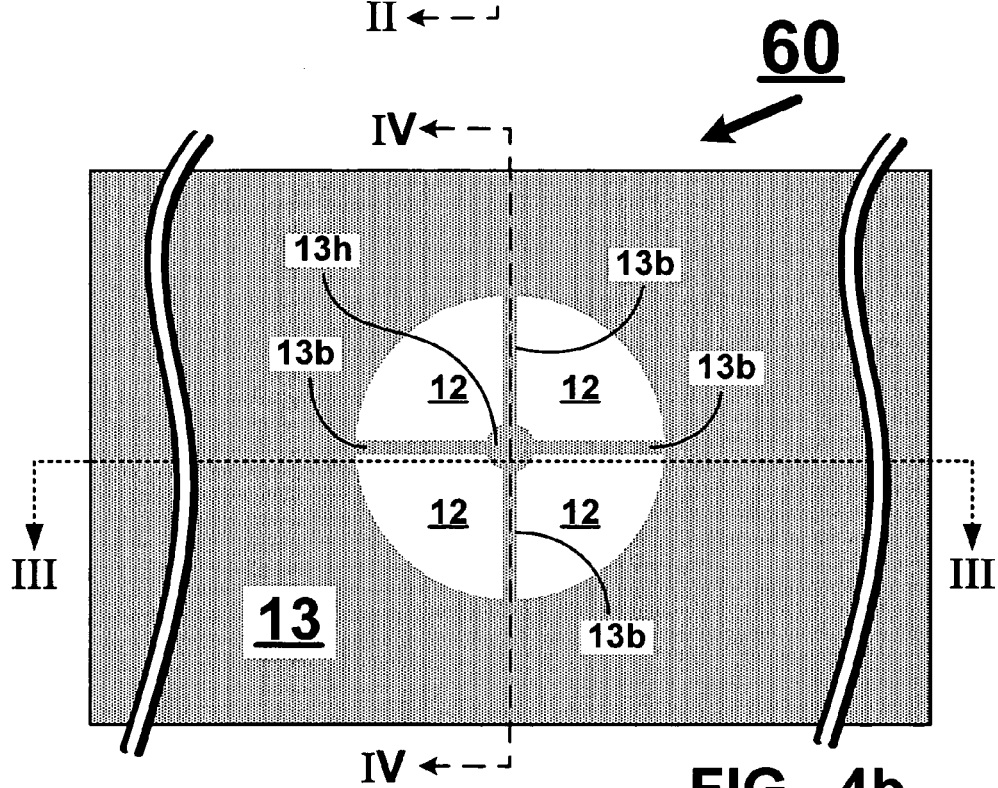
Figure 4C:
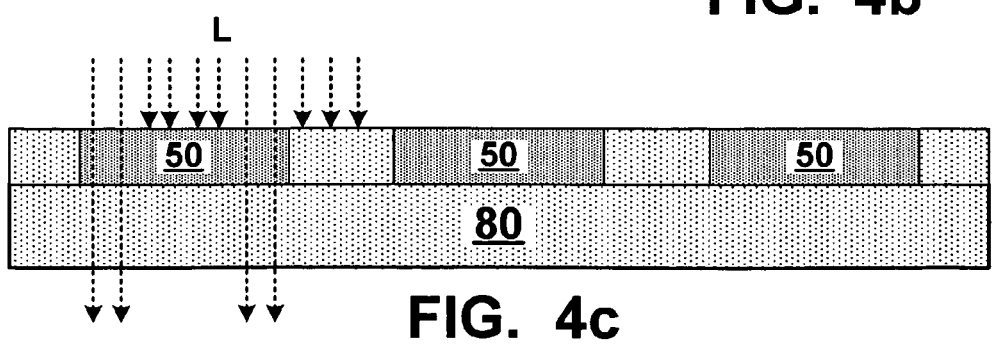
FIG. 4c is a cross-sectional view of a photomask including a plurality of beam-and-hat patterns.

Turning now to FIGS. 2c and 2d, at a stage 107, the mask layer 13 is patterned with a beam-and-hat pattern. The patterning of the mask layer 13 can be accomplished using photolithographic processes that are well understood in the microelectronics art. As one example, the mask layer 13 can be exposed with a light L through a photomask (not shown) that includes a beam-and-hat pattern 50 as depicted in FIGS. 4a through 4c. After the exposure with the light L, the mask layer 13 can be developed to form a beam-and-hat mask (13, 13h, 13b) in the mask layer 13. For instance, a solvent can be used to develop the mask layer 13. Accordingly, the patterning at the stage 107 includes any steps necessary to form the beam-and-hat mask (13, 13h, 13b) in the mask layer 13 using the beam-and-hat pattern 50. The photomask can include a single instance of the beam-and-hat pattern 50 and a step-and-repeat lithography process can be used to pattern one or more instances of the beam-and-hat pattern 50 in the mask layer 13. Alternatively, the beam-and-hat pattern 50 can be replicated several times in the photomask and a plurality of the beam-and-hat patterns 50 can be simultaneously patterned in the mask layer 13 in a single exposure through the photomask.

Examples of a variety of configurations for the beam-and-hat pattern 50 are depicted in FIGS. 3a through 3g. The beam-and-hat pattern 50 includes a frame portion 50f, at least one beam portion 50b, and a hat portion 50h. One or more portions 51 have a shape defined by the pattern formed by the portions 50*f*, 50*b*, and 50*h*. The beam portions 50*b* are connected with the hat portion 50*h* and the frame portion 50*f*. The portions 51 can be optically transparent to the light L and the portions (50*f*, 50*b*, 50*h*) can be optically opaque to the light L, or vice-versa. Preferably, two or more beam portions 50*b* are connected with the hat portion 50*h*. In FIG. 4*c*, one or more of the beam-and-hat patterns 50 can be connected with a substrate 80 and the substrate 80 can be optically transparent to light (e.g. ultraviolet light). The substrate 80 can be an optically stable material, such as a photomask, for example. The portions 51 can be those portions of the substrate 80 that are not covered by the portions 50*f*, 50*b*, and 50*h*.

Figure 3A:
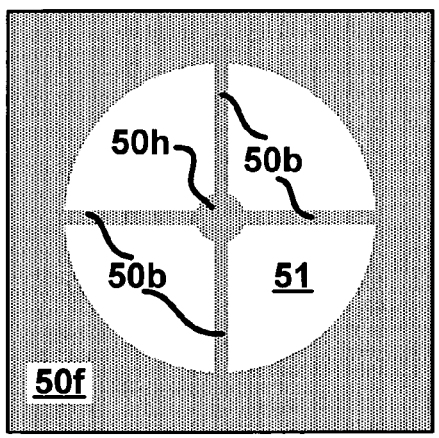
FIGS. 3a through 3g are top plan views depicting a beam-and-hat pattern.
Figure 3B:
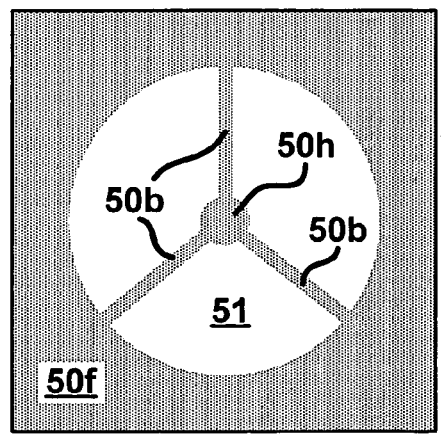
Figure 3C:
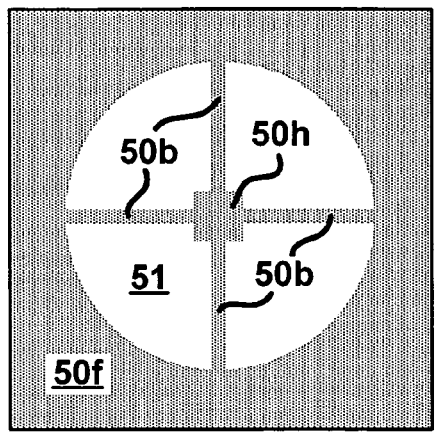
Figure 3D:
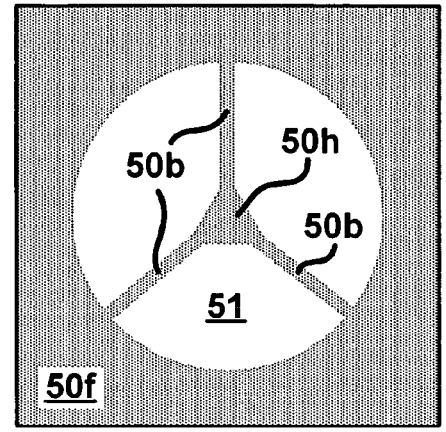
Figure 3E:
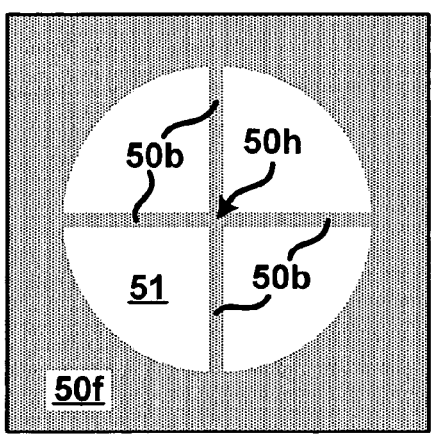
Figure 3F:
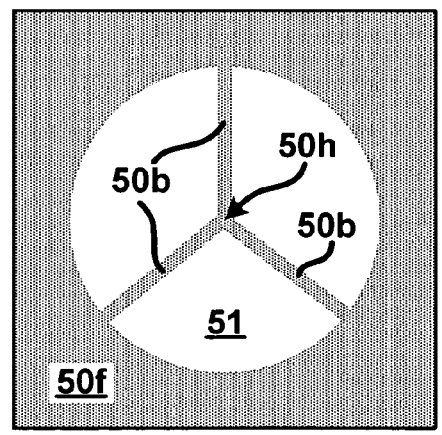
Figure 3G:
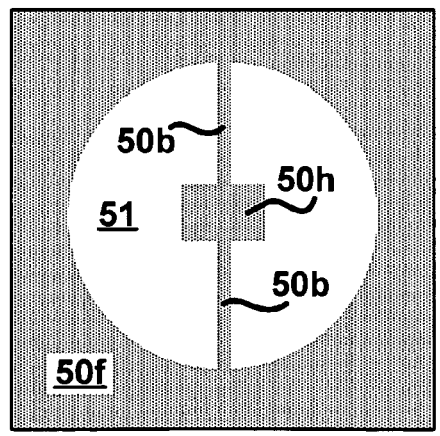

The hat portion 50*h* can include a variety of shapes including but not limited to a circular shape, a semi-circular shape, an arcuate shape (e.g. an oval or an ellipse), a square shape, a triangular shape, and a rectangular shape (see FIG. 3*a* through 3*g*). The shapes depicted herein are examples only and the present invention is not be construed as being limited to those shapes. Alternatively, a shape of the hat portion 50*h* can be determined by an intersection of a plurality of the beam portions 50*b* with one another. In FIG. 3*e*, four beam portions 50*b* intersect with one another to form the hat portion 50*h* at the intersection of the beam portions 50*b*. Similarly, in FIG. 3*f*, three beam portions 50*b* intersect with one another to form the hat portion 50*h*. The shape selected for the hat portion 50*h* will be application specific and can depend on several factors including but not limited to the material selected for the tip layer 12, the thickness t of the tip layer 12, an isotropic etch material and an isotropic etch process used to etch the tip layer 12, and a desired size, shape, and sharpness of a tip to be formed in the tip layer 12, just to name a few.

For purposes of illustration, the beam-and-hat pattern 50 of FIG. 4*a* is used to pattern the mask layer 13 at the stage 107 as depicted in FIGS. 2*c* and 2*d*. Accordingly, along a dashed line I—I of the beam-and-hat pattern 50, light L passes through portions 51 that are optically transparent and exposes portions of the mask layer 13 as depicted by exposed regions 13*e* between the heavy dashed lines in the mask layer 13 in FIG. 2*c*. However, the frame portion 50*f* and the hat portion 50*h* are opaque to the light L. As a result, a portion of the mask layer 13 and a hat portion 13*h* of the mask layer 13 are not exposed to the light L.

In contrast, along a dashed line II—II of the beam-and-hat pattern 50, the light L does not pass through the hat portion 50*h*, the beam portion 50*b*, or the frame portion 50*f*. Consequently, in FIG. 2*d*, the mask layer 13 includes unexposed portions 13, 13*h*, and 13*b* with the portion 13*h* forming a hat portion and the portion 13*b* forming a beam portion of a beam-and-hat mask 60. After developing the mask layer 13, the mask layer 13 includes the beam-and-hat mask 60 as depicted in FIG. 4*b*. The beam-and-hat mask 60 includes a hat portion 13*h* defined by the hat portion 50*h*, a beam portion 13*b* defined by the beam portion 50*b*, and a portion 13 defined by the frame portion 50*f*. The beam portions 13*b* are connected with the hat portion 13*h* and the mask layer 13. The beam portions 13*b* serve as cross members that support the hat portion 13*h* and prevent a release of the hat portion 13*h* during an isotropic etch process to be described below. In FIG. 2*e*, a cross-sectional view along a dashed line III—III of FIG. 4*b* depicts an exposed surface of the tip layer 12 created by the developing of the mask layer 13 to form the beam-and-hat mask 60. In FIG. 2*f*, a cross-sectional view along a dashed line IV—IV of FIG. 4*b* depicts the portions (13*h*, 13*b*, and 13) of beam-and-hat mask 60 that cover a portion of the tip layer 12.

At a stage 109, the tip layer 12 is isotropically etched as depicted by dashed arrows $e_i$ in FIG. 2*f*. The exposed portions of the tip layer 12 are etched down to the surface 11*s* of the underlayer 11; whereas, the portions of the tip layer 12 that are covered by the portions (13*h*, 13*b*, and 13) of beam-and-hat mask 60 are undercut by the isotropic etching $e_i$ as depicted by the heavy dashed lines U in the tip layer 12 in FIG. 2*e*. The beam-and-hat mask 60 is laterally undercut as the isotropic etching $e_i$ proceeds downward to the surface 11*s* of the underlayer 11. The underlayer 11 can serve as an etch stop for the isotropic etching $e_i$ process. In a true isotropic etching process, the amount of the lateral undercut U will be equal to a depth of the etch and therefore be equal to the thickness t of the tip layer 12. However, the amount of undercut U will decrease as a function of depth.

Figure 2H:
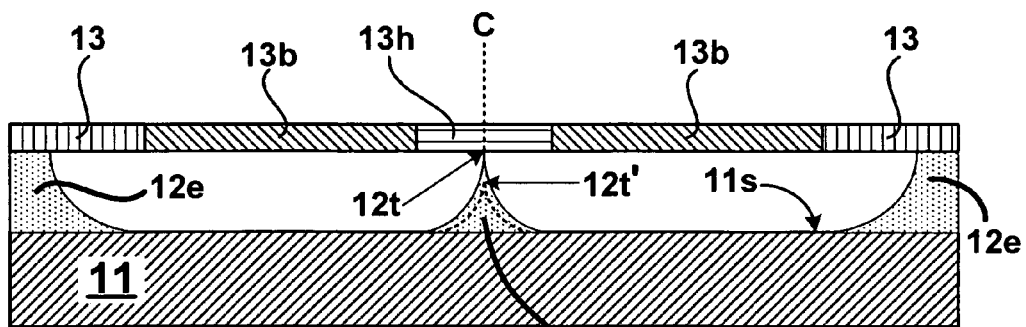
FIGS. 2a through 2n are cross-sectional views depicting a method of fabricating a sharp protrusion on an underlayer.

For features of the beam-and-hat mask 60 that are narrow relative to the undercut U, the material of the tip layer 12 may be completely removed during the isotropic etching $e_i$ even if covered by mask layer 13 thereby completely releasing the narrow features of the mask layer 13 from the tip layer 12 (e.g. the beam portion 13*b* of the beam-and-hat mask 60 in FIG. 2*h*). On the other hand, areas of the beam-and-hat mask 60 that are wider than the undercut U (e.g. the portions 13) are not completely released from the tip layer 12 and are used to anchor the beam-and-hat mask 60 to the remaining portions 12*e* of the tip layer 12 and to support the hat portion 13*h*.

By connecting the narrow features (i.e. 13*b* and 13*h*) with wider features (i.e. 13), the narrow features are prevented from falling off or being released from the beam-and-hat mask 60 during the isotropic etching $e_i$ process. By carefully designing the beam portions 13*b* of the beam-and-hat mask 60, and optionally including a circular, rectangular, or other shape for the hat portion 13*h*, the undercut U can be controlled so that two or more etch fronts will meet under a center C of the hat portion 13*h* to form a tip that includes a vertex as will be described below.

Cross-sectional views taken along dashed lines III—III and IV—IV respectively of FIG. 4*b* depict a tip 12*p* (see FIGS. 2*g* and 2*h*) formed in the tip layer 12 by the isotropic etching $e_i$. The tip 12*p* extends outward of the surface 11*s* of the underlayer 11 and includes a vertex 12*t*. Although only one tip 12*p* is depicted, a plurality of tips 12*p* can be formed on the underlayer 11. The number of tips 12*p* will be determined by the number of beam-and-hat patterns 50 that are patterned on the mask layer 13 at the stage 107. Preferably, the tip 12*p* includes a sharp point at the vertex 12*t*. The vertex 12*t* may be in contact with the hat portion 13*h* or the vertex may be positioned below the hat portion 13*h* as depicted by the dashed lines for 12*t'* in FIGS. 2*g* and 2*f*. If the vertex 12*t* is in contact with the hat portion 13*h*, then that contact can aid in preventing a release of the hat portion 13*h* that could damage the tip 12*p* and/or create a defect that can be caused if the hat portion 13*h* is released. However, even though the vertex 12*t'* is not in contact with the hat portion 13*h*, the hat portion 13*h* is nevertheless held in place and supported by the beam portions 13*b* thereby preventing the release of the hat portion 13*h*.

The etch material for the isotropic etching $e_i$ should be selective to the material of the tip layer 12 and not significantly etch the material for the mask layer 13. After the isotropic etching $e_i$ at the stage 109, a portion 12*e* of the tip layer 12 remains on the underlayer 11 and the beam-and-hat mask 60 remains with the hat portion 13*h* positioned over the tip 12*p* and supported by the beam portions 13*b*.

Figure 2I:
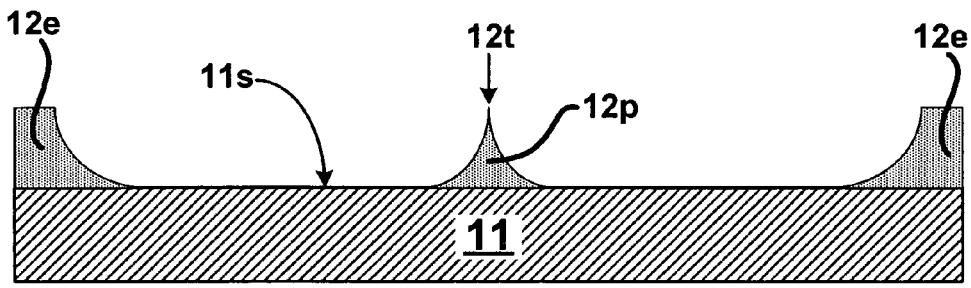

At a stage 111, as depicted in FIG. 2*i*, the mask layer 13 is removed so that the beam-and-hat mask 60 is removed from the remaining portions of the tip layer 12 (e.g. 12e and 12p). For example, if the mask layer 13 is made from a photoresist material, then a solvent or an ashing process can be used to remove the mask layer 13. Alternatively, an etching process selective to the material of the mask layer 13 can be used to effectuate the removing of the mask layer 13 at the stage 111.

Figure 2J:
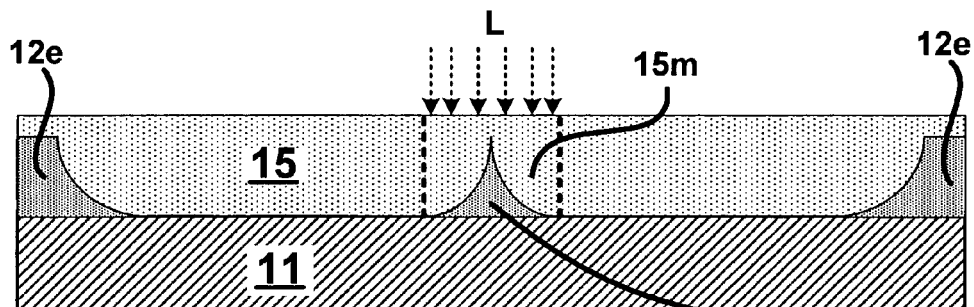

Optionally, at a stage 112, it may be desirable to deposit a protective layer over the tip layer 12. If the protective layer is not required, then the method 101 can terminate at a stage 121. On the other hand, if a protective layer is required, then at a stage 113, a protective layer 15 is deposited over the tip layer 12 as depicted in FIG. 2j. The protective layer 15 completely covers the tip 12p and the remaining portions 12e of the tip layer 12. The protective layer 15 can be made from any material that can be patterned. For example, the protective layer 15 can be a photoresist material or a mask material patterned using a photolithographic/etch process. At a stage 115, the protective layer 15 is patterned to form an etch mask in the protective layer 15. The etch mask completely covers the tip 12p. As was described above, the patterning at the stage 115 can be accomplished using well understood photolithography processes. As one example, the protective layer 15 can be exposed to light L through a photomask (not shown) to expose a portion of the protective layer 15 over the tip 12p with a pattern as depicted by the heavy dashed lines astride the tip 12p in the protective layer 15.

Figure 2K:
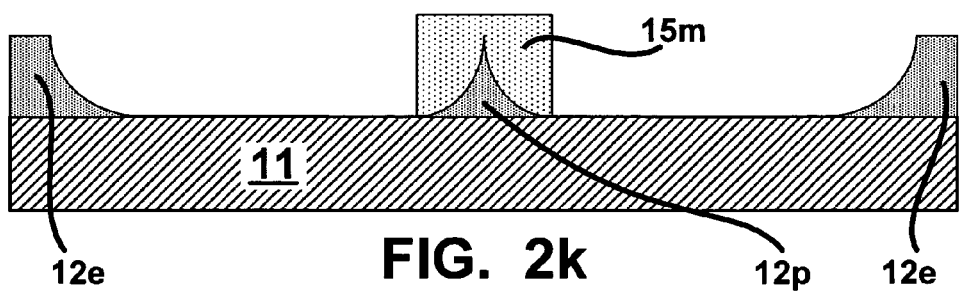
Figure 2M:
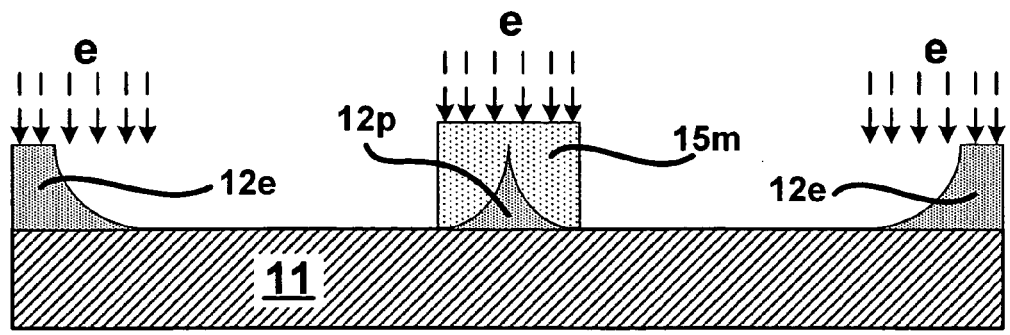
Figure 2M:
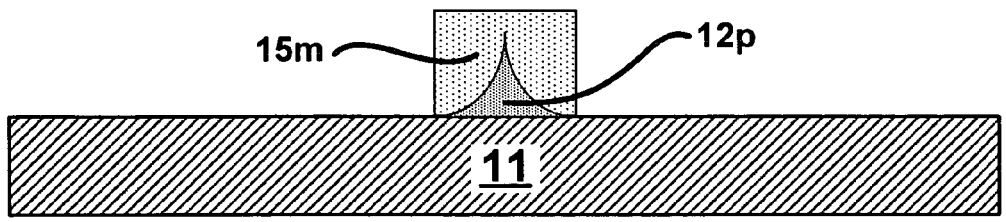

In FIG. 2k, the protective layer 15 is developed to form an etch mask 15m that completely covers the tip 12p. Moreover, after the developing, the remaining portions 12e of the tip layer 12 are not covered by the protective layer 15. Optionally, at a stage 116, it may be desirable to remove the remaining portions of the tip layer 12. Accordingly, in FIG. 2, at a stage 117, remaining portions of the tip layer 12 that are not covered by the etch mask 15m (e.g. the remaining portions 12e) can be etched e by an etch material that is selective to the material of the tip layer 12 to remove those remaining portions. Hence, the etch mask 15m prevents the tip 12p from being etched at the stage 117. Therefore, in FIG. 2m, after the optional etching e at the stage 117, the tip 12p remains in contact with the underlayer 11 and is covered by the etch mask 15m. The etch mask 15m can also protect the tip 12p from processing of the underlayer 11 that is unrelated to the method 101.

Figure 2N:
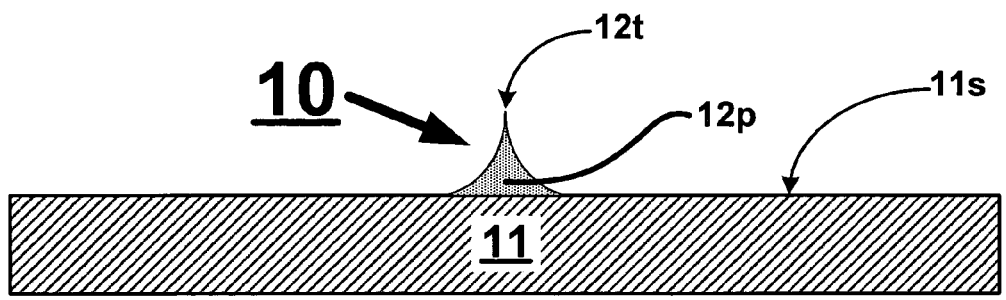
Figure 6A:
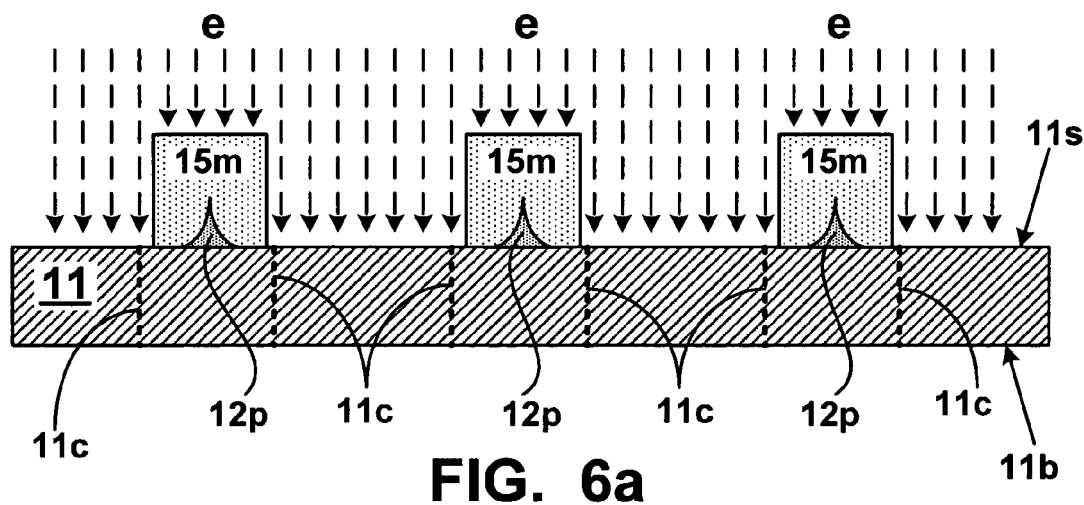
FIG. 6a is a cross-sectional view depicting an etching of an underlayer.

Turning to FIG. 2n, at a stage 119, the etch mask 15m is removed from the tip 12p and the underlayer 11. A solvent or an ashing process can be used to remove the etch mask 15m. Alternatively, an etching process selective to the material of the etch mask 15m can be used to remove the etch mask 15m. Consequently, after the stage 119, a sharp protrusion 10 connected with the underlayer 11 and extending outward from the underlayer 11 is formed. The sharp protrusion 10 includes the tip 12p and the vertex 12t. Although only a single sharp protrusion 10 is depicted in FIG. 2n, a plurality of the sharp protrusions 10 can be fabricated on the underlayer 11 (see FIG. 6a).

After the sharp protrusion 10 has been formed, it may be desirable to remove all or a portion of the underlayer 11 that surrounds the sharp protrusion 10 in order to form a cantilever structure. Accordingly, a cantilever mask layer can be deposited on the underlayer 11 and then patterned to form a cantilever mask, followed by an etching process to remove some or all of the underlayer 11 surrounding the sharp protrusion 10. As an example, in FIG. 6a, prior to the removing of the etch mask 15m at the stage 119, the underlayer 11 can be etched e with an etch material that is selective to the material of the underlayer 11 and the etching e can continue until the underlayer 11 is etched completely through to the bottom surface 11b as depicted by the dashed lines 11c. Accordingly, the etch mask 15m can serve as the cantilever mask and the previously deposited protective layer 15 can serve as a cantilever mask layer. The etch process can be an anisotropic etch that forms substantially vertical sidewall surfaces for the cantilever as depicted by the dashed lines 11c.

However, the etch mask 15m may not be suitable as the cantilever mask for several reasons including the shape and dimensions of the etch mask 15m are not compatible with a desired shape and dimensions for the cantilever. If the etch mask 15m is not suitable as the cantilever mask, then the etch mask 15m can be removed at the stage 119 and a cantilever mask layer (not shown) can be deposited on the underlayer 11, followed by a patterning of the cantilever mask layer to form the cantilever mask. The depositing and patterning of the cantilever mask layer can be accomplished in a manner similar to the depositing and patterning of the protective layer 15 to form the etch mask 15m as was described above. The underlayer 11 can then be etched to form the cantilever. The cantilever mask should completely cover the sharp protrusion 10 and protect the sharp protrusion 10 from damage during the patterning of the cantilever mask layer and the etching of the underlayer 11.

Figure 6B:
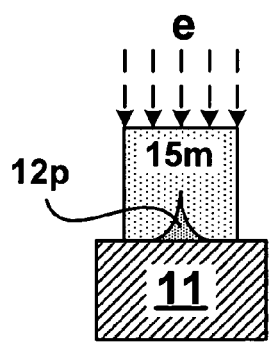
FIG. 6b is a cross-sectional view depicting an etching of an etch mask.
Figure 6C:
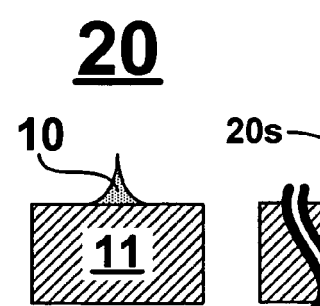
FIGS. 6c and 6d are a front profile view and a side profile view respectively of a cantilever including a sharp protrusion.
Figure 6D:
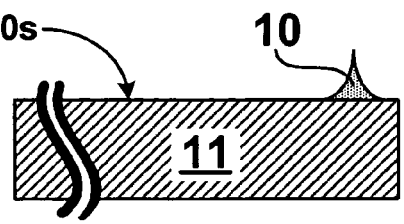

In FIG. 6b, after the etching e of the underlayer 11, the etch mask 15m or the cantilever mask can be removed in the manner described above in reference to FIG. 2j and the stage 119 (e.g. by etching, ashing, or using a solvent). Consequently, in FIGS. 6c and 6d, a cantilever 20 is formed. The cantilever 20 includes the sharp protrusion 10 (i.e. the tip 12p and the vertex 12t) connected therewith and extending outward of a surface 20s of the cantilever 20.

Figure 1B:
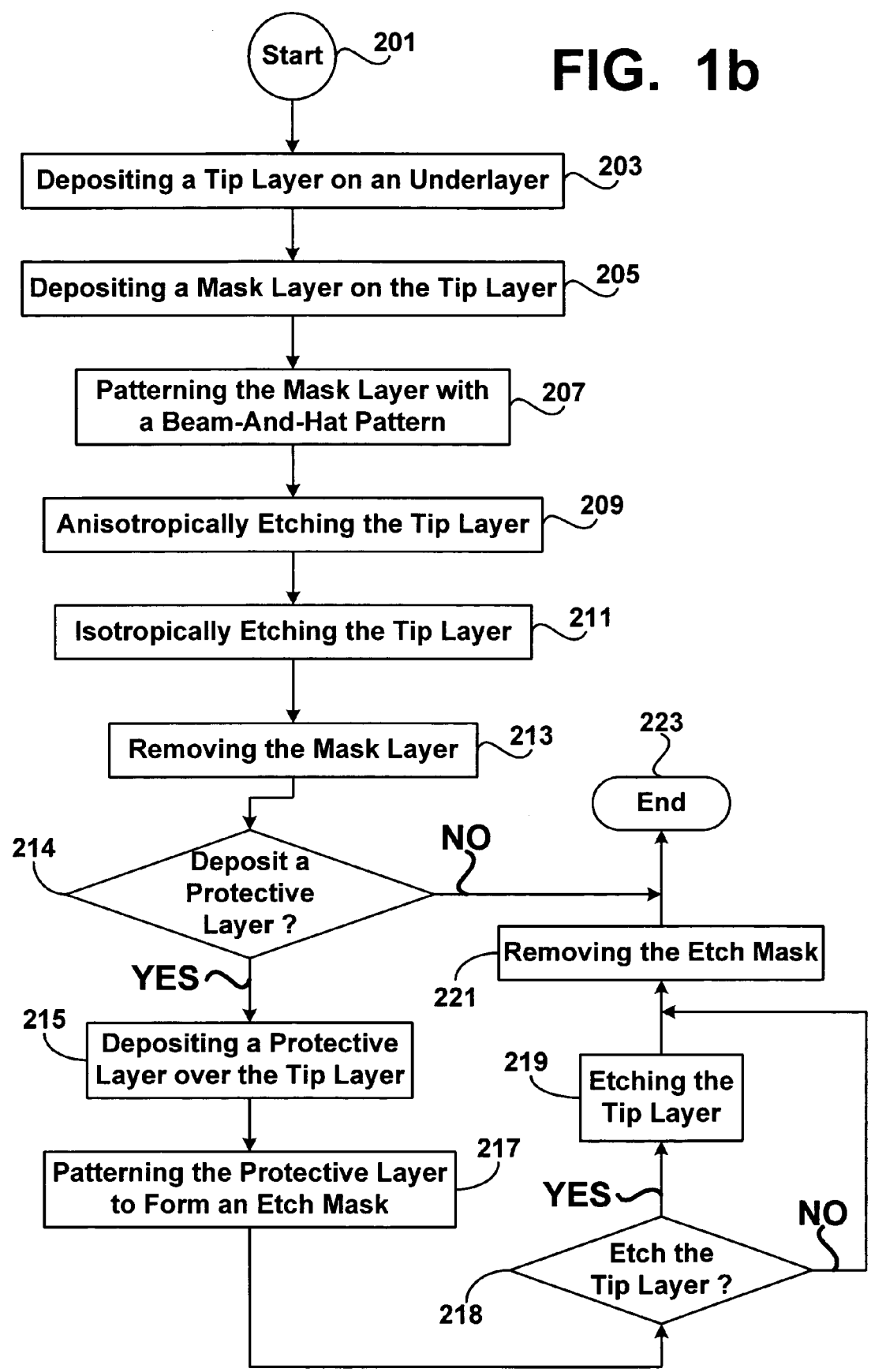
FIG. 1b is a flow diagram depicting an alternative method of fabricating a sharp protrusion on an underlayer.

Referring to FIG. 1b, an alternative method 201 of fabricating a sharp protrusion on an underlayer includes at a stage 203, depositing a tip layer 12 on an underlayer 11 as was described above in reference to FIG. 2a. At a stage 205, a mask layer 13 is deposited on the tip layer 12 as was described above in reference to FIG. 2b. At a stage 207, the mask layer 13 is patterned with the beam-and-hat pattern 50 to form the beam-and-hat mask 60 as was described above in reference to FIGS. 2c and 2d, and in reference to FIGS. 4a and 4b.

In the alternative method 201, at a stage 209, those portions of the tip layer 12 that are not covered by the beam-and-hat mask 60 (i.e. exposed portions of the tip layer 12) are anisotropically etched $e_a$ to a predetermined depth $d_1$ as depicted in FIGS. 5a and 5b. The predetermined depth $d_1$ can be measured from a surface 12s of the tip layer 12. As a result of the anisotropic etching $e_a$, a thickness $t_1$ of the tip layer 12 is reduced in those areas that are not covered by beam-and-hat mask 60 and the thickness $t_1$ is less than a thickness t of the tip layer 12 in those areas that are covered by beam-and-hat mask 60. The predetermined depth $d_1$ will be application dependent and can vary depending on the material selected for the tip layer 12, the etch material used for the anisotropic etching $e_a$, and other process parameters, just to name a few. As one example, the predetermined depth $d_1$ can be about one half the thickness t of the tip layer 12.

The anisotropic etching $e_a$ can be used to change a character of the resulting tip 12p that will subsequently be formed in the tip layer 12. The anisotropic etching $e_a$ can be used to alter the undercutting of the tip layer 12 (see dashed lines U in FIG. 5c) during a subsequent isotropic etch process to be described below. As an example, the reduced thickness $t_1$ of the tip layer 12 can be used to modify etch front propagation during the isotropic etch process. By modifying how the etch fronts propagate through the tip layer 12, the resulting tip 12p can be made narrower, shorter, or both. Moreover, as will be discussed below in reference to FIG. 5e, the etch fronts can form two tips having a common vertex, with one tip in contact with the underlayer and another tip in contact with the hat portion 13h.

In FIG. 5c, at a stage 211, the tip layer 12 is isotropically etched $e_i$ to undercut those portions of the tip layer 12 that are covered by the beam-and-hat mask 60. The formation of a single tip or two tips by the isotropic etching $e_i$ will depend in part on how the etch fronts propagate through the tip layer 12. In FIG. 5d, the isotropic etching $e_i$ forms a single tip 12p that includes a vertex 12t as was described above in reference to FIGS. 2g and 2h and in reference to the stage 109 of FIG. 1a. The tip 12p can have a height $H_1$ that is substantially equal to the thickness t of the tip layer 12. As was described above, the vertex 12t may or may not be in contact with the hat portion 13h.

Alternatively, two tips can be formed by the isotropic etching $e_i$ as depicted in FIGS. 5e and 5f, where the isotropic etching $e_i$ forms a first tip 12p connected with the underlayer 11 and including a vertex 12t and a second tip 12h and including a vertex 12c. The second tip 12h is in contact with the hat portion 13h of the beam-and-hat mask 60. The tip 12p of FIGS. 5e and 5f can have a height $H_2$ that is less than the thickness t of the tip layer 12. For example, the height $H_2$ can be substantially equal to the thickness $t_1$ of FIG. 5b. Moreover, the tip 12p of FIGS. 5e and 5f can have a width $W_2$ that is less than a width $W_1$ of the single tip 12p depicted in FIG. 5d. The variations in the height $H_2$ and/or the width $W_2$ of the tip 12p are due to the combined effects of the anisotropic etching $e_a$ to the predetermined depth $d_1$ at the stage 209 and the isotropic etching $e_i$ at the stage 211. Those skilled in the microelectronics art will appreciate that the process parameters for the anisotropic etching $e_a$ and the isotropic etching $e_i$ can be controlled to meet application specific requirements for the dimensions of the tips (12p and 12h). The vertices (12t and 12c) of the tips (12p and 12h) may be in contact with each other as depicted or the vertices (12t and 12c) may not be in contact with each other. Contact or the lack of contact between the vertices (12t and 12c) will be determined in part by factors including the propagation rates of the etch fronts, the reduced thickness $t_1$ of the tip layer 12, and the material of the tip layer 12, just to name a few.

Figure 5G:
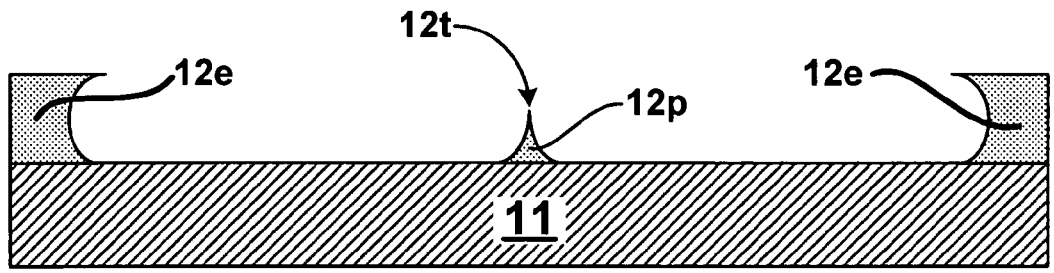

In FIG. 5g, at a stage 213, the mask layer 13 is removed as was described above. If a single tip 12p was formed as depicted in FIG. 5d, then the beam-and-hat mask 60 including the hat portion 13h are removed at the stage 213. On the other hand, if two tips were formed (12p, 12h) as depicted in FIGS. 5e and 5f, then the beam-and-hat mask 60 including the hat portion 13h and the second tip 12h which is connected with the hat portion 13h are removed at the stage 213 so only the first tip 12p remains. The removal of the beam-and-hat mask 60 can result in the second tip 12h being removed by a lift-off process because the second tip 12h is connected with the hat portion 13h.

Figure 5H:
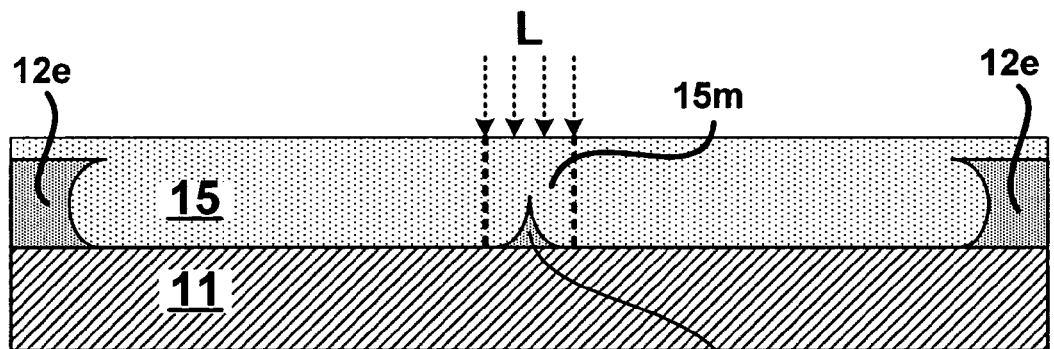
Figure 5I:
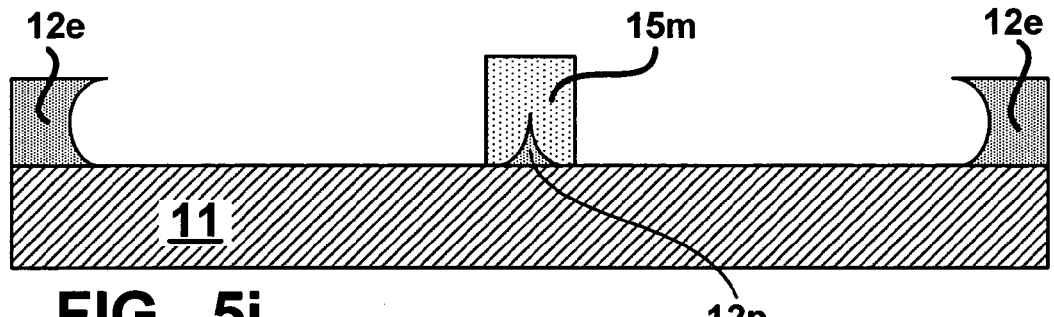
Figure 5J:
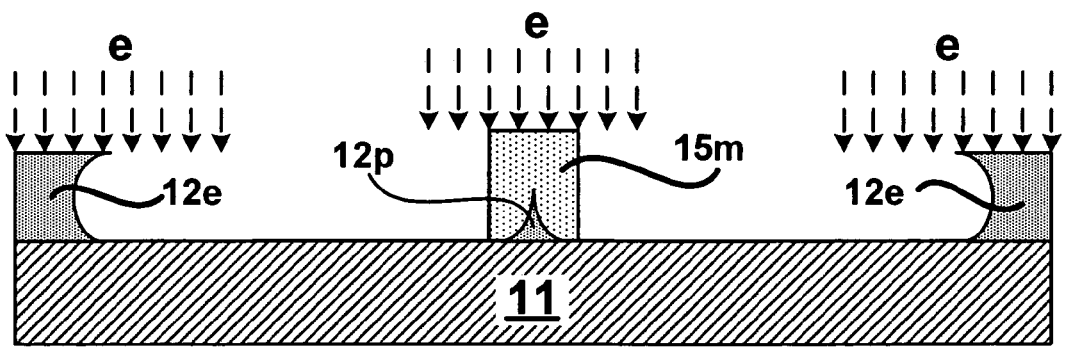

Optionally, at a stage 214, it may be desirable to deposit a protective layer over the tip layer 12. If the protective layer is not required, then the method 201 can terminate at a stage 223. On the other hand, if the protective layer is required, then at a stage 215, a protective layer 15 is deposited over the tip layer 12 as depicted in FIGS. 5h and 5i. The protective layer 15 completely covers the tip 12p and the remaining portions 12e of the tip layer 12. At a stage 217, the protective layer 15 is patterned to form an etch mask 15m in the protective layer 15 as was described above. After the etch mask 15m is formed, the remaining portions 12e of the tip layer 12 are no longer covered by the protective layer 15. Optionally, at a stage 218, it may be desirable to remove the remaining portions of the tip layer 12. Accordingly, in FIG. 5j, at a stage 219, the remaining portions of the tip layer 12 that are not covered by the etch mask 15m (i.e the remaining portions 12e) can be etched e by an etch material that is selective to the material of the tip layer 12 to remove those remaining portions. Accordingly, in FIG. 5k, after the optional etching e at the stage 219, the tip 12p remains in contact with the underlayer 11 and is covered by the etch mask 15m.

Figure 5K:
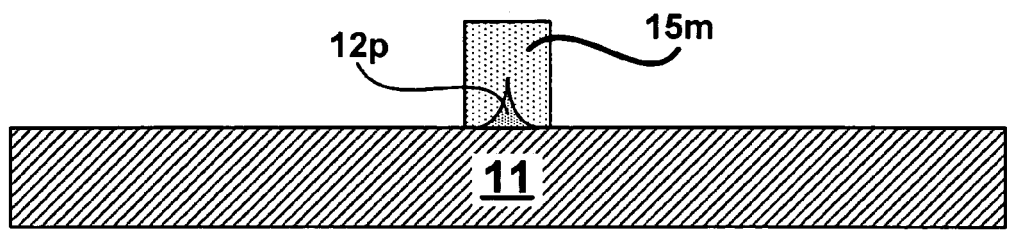
Figure 5L:
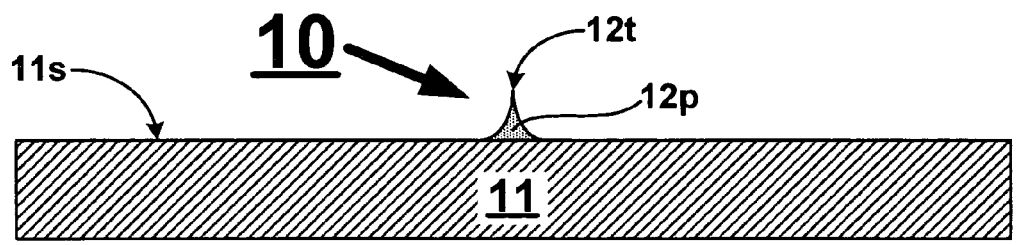

In FIG. 5k, at a stage 221, the etch mask 15m is removed as was described above. Consequently, in FIG. 5l, after the stage 221, a sharp protrusion 10 connected with the underlayer 11 and extending outward from the underlayer 11 is formed. The sharp protrusion 10 includes the tip 12p and the vertex 12t. Although only a single sharp protrusion 10 is depicted in FIG. 5l, a plurality of the sharp protrusions 10 can be fabricated on the underlayer 11 as was described above in reference to FIG. 6a. The underlayer 11 can be patterned and then etched to form a cantilever 20 that includes the sharp protrusion 10 as was described above in reference to FIGS. 6a through 6d. The etch mask 15m can be used as the cantilever mask or after the removing of the etch mask 15m at the stage 221, a cantilever mask layer can be deposited on the underlayer 11 and subsequently patterned to form the cantilever mask.

Although several embodiments of the present invention have been disclosed and illustrated, the invention is not limited to the specific forms or arrangements of parts so described and illustrated. The invention is only limited by the claims.

What is claimed is:

1. A method of fabricating a sharp protrusion on an underlayer, comprising:
   depositing a tip layer on the underlayer;
   depositing a mask layer on the tip layer;
   patterning the mask layer with a beam-and-hat pattern to form a beam-and-hat mask;
   isotropically etching the tip layer to undercut portions of the tip layer covered by the beam-and-hat mask to form a tip connected with the underlayer and including a vertex; and
   removing the mask layer.

2. The method as set forth in claim 1, wherein the tip layer comprises a material selected from the group consisting of a dielectric material, an electrically conductive material, and a semiconductor material.

3. The method as set forth in claim 1, wherein after the isotropically etching, the vertex of the tip is in contact with the hat portion of the beam-and-hat mask.

4. The method as set forth in claim 1 and further comprising after the removing: depositing a protective layer over the tip layer; patterning the protective layer to form an etch mask that completely covers the tip; and removing the etch mask.

5. The method as set forth in claim 4 and further comprising prior to the removing the etch mask: etching the tip layer to remove a remaining portion of the tip layer that is not covered by the etch mask.

6. The method as set forth in claim 1 and further comprising: depositing a cantilever mask layer on the underlayer; patterning the cantilever mask layer to form a cantilever mask on the underlayer that protects the tip and covers a portion of the underlayer; etching the underlayer to form a cantilever that includes the tip; and removing the cantilever mask.

7. The method as set forth in claim 6, wherein the cantilever mask layer comprises a protective layer previously deposited on the tip layer and the cantilever mask comprises an etch mask formed by a patterning of the protective layer.

8. The method as set forth in claim 6, wherein the depositing of the cantilever mask layer on the underlayer occurs after a removing of an etch mask from the underlayer.

9. The method as set forth in claim 6, wherein the etching comprises an anisotropic etch.

10. A cantilever including a sharp protrusion fabricated according to the method as set forth in claim 6.

11. A method of fabricating a sharp protrusion on an underlayer, comprising:
depositing a tip layer on the underlayer; depositing a mask layer on the tip layer;
patterning the mask layer with a beam-and-hat pattern to form a beam-and-hat mask;
anisotropically etching the tip layer to a predetermined depth; isotropically etching the tip layer to undercut portions of the tip layer covered by the beam-and-hat mask to form a tip connected with the underlayer and including a vertex; and removing the mask layer.

12. The method as set forth in claim 11 and further comprising after the isotropically etching the tip layer: a second tip connected with the hat portion of the beam-and-hat mask and the second tip including a vertex.

13. The method as set forth in claim 11, wherein the vertex of the tip and the vertex of the second tip are in contact with each other.

14. The method as set forth in claim 11, wherein the tip layer comprises a material selected from the group consisting of a dielectric material, an electrically conductive material, and a semiconductor material.

15. The method as set forth in claim 11 and further comprising after the removing the mask layer: depositing a protective layer over the tip layer; patterning the protective layer to form an etch mask that completely covers the tip; and removing the etch mask.

16. The method as set forth in claim 15 and further comprising prior to the removing the etch mask: etching the tip layer to remove a remaining portion of the tip layer that is not covered by the etch mask.

17. The method as set forth in claim 11 and further comprising: depositing a cantilever mask layer on the underlayer; patterning the cantilever mask layer to form a cantilever mask on the underlayer that protects the tip and covers a portion of the underlayer; etching the underlayer to form a cantilever that includes the tip; and removing the cantilever mask.

18. The method as set forth in claim 17, wherein the cantilever mask layer comprises a protective layer previously deposited on the tip layer and the cantilever mask comprises an etch mask formed by a patterning of the protective layer.

19. The method as set forth in claim 17, wherein the depositing of the cantilever mask layer on the underlayer occurs after a removing of an etch mask from the underlayer.

20. The method as set forth in claim 17, wherein the etching comprises an anisotropic etch.

* * * * *